(12) United States Patent
Tajan et al.

(10) Patent No.: US 10,526,067 B2
(45) Date of Patent: Jan. 7, 2020

(54) PROPELLER RING COMPRISING RADIAL HOUSINGS WITH AN OVOID CROSS-SECTION

(71) Applicant: Safran Aircraft Engines, Paris (FR)

(72) Inventors: Sebastien Emile Philippe Tajan, Moissy-Cramayel (FR); Charles-Henri Michel Marie Derrez, Moissy-Cramayel (FR); Anthony Lafitte, Moissy-Cramayel (FR); Cyril Roger Yves Le Pecheur, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 232 days.

(21) Appl. No.: 15/523,295

(22) PCT Filed: Oct. 30, 2015

(86) PCT No.: PCT/FR2015/052939
§ 371 (c)(1),
(2) Date: Apr. 28, 2017

(87) PCT Pub. No.: WO2016/066977
PCT Pub. Date: May 6, 2016

(65) Prior Publication Data
US 2017/0313403 A1 Nov. 2, 2017

(30) Foreign Application Priority Data

Oct. 31, 2014 (FR) .................................... 14 60504

(51) Int. Cl.
*B64C 11/06* (2006.01)
*B64D 27/10* (2006.01)
*B64D 27/00* (2006.01)

(52) U.S. Cl.
CPC .............. *B64C 11/06* (2013.01); *B64D 27/10* (2013.01); *B64D 2027/005* (2013.01); *Y02T 50/66* (2013.01)

(58) Field of Classification Search
CPC ........................................................ B64C 11/06
See application file for complete search history.

(56) References Cited

U.S. PATENT DOCUMENTS 5,154,372 A * 10/1992 Hora .......................... F01D 1/24
244/62
8,926,279 B2 * 1/2015 Boston .................. B64C 11/306
416/129

(Continued)

FOREIGN PATENT DOCUMENTS

EP      2586701      5/2013
FR      2953487      6/2011

(Continued)

OTHER PUBLICATIONS

French Search Report and Written Opinion, dated Jun. 17, 2015, French Application No. FR1460504.

(Continued)

*Primary Examiner* — Justin D Seabe
*Assistant Examiner* — Jason A Fountain
(74) *Attorney, Agent, or Firm* — Womble Bond Dickinson (US) LLP

(57) ABSTRACT

The invention relates to a propeller ring (10) of a turbomachine (1), with variable-pitch blades (P), the propeller ring (10) comprising a substantially coaxial annular body (11) with a main axis (A) and a plurality of radial housings (12) uniformly distributed around the main axis (A), each radial housing (12) being designed to receive a bearing (13) for a root (14) of a blade (P) so as to allow the variable pitch of the blade (P), the radial housings (12) having a substantially (Continued)

ovoid cross-section in a plane (T) tangential to the annular body (11).

21 Claims, 2 Drawing Sheets

(56) References Cited

U.S. PATENT DOCUMENTS

| | | | | |
|---|---|---|---|---|
| 9,145,776 B2* | 9/2015 | Mackie | ................... | F01D 5/30 |
| 2012/0321476 A1* | 12/2012 | Mackie | ................... | F01D 5/30 |
| | | | | 416/220 R |
| 2017/0313404 A1* | 11/2017 | Colmagro | ............... | B64C 11/06 |

FOREIGN PATENT DOCUMENTS

| FR | 2992677 | 1/2014 |
|---|---|---|
| GB | 1549001 | 8/1979 |

OTHER PUBLICATIONS

International Search Report and Written Opinion with English Language Translation, dated Jan. 28, 2016, Application No. PCT/FR2015/052939.

* cited by examiner

PROPELLER RING COMPRISING RADIAL HOUSINGS WITH AN OVOID CROSS-SECTION

FIELD OF THE INVENTION

The present invention relates to the field of propeller rings of turbomachine with variable-pitch blades. It finds advantageous application in particular in the case of unducted propellers (open rotors or unducted fans).

TECHNOLOGICAL BACKGROUND

Shown in FIG. 1 is a turbomachine of the type with unducted propellers. It comprises, from upstream to downstream, in the air flow direction shown by the arrows F, a compressor 2, an annular combustion chamber 3, a high-pressure turbine 6, and two contra-rotating low-pressure turbines 8. Each low-pressure turbine 8 is integral with an external propeller 9, the two propellers being arranged coaxially one behind the other around a longitudinal axis A of the turbomachine 1 and each comprising a plurality of blades P regularly distributed around said axis.

To this end, each propeller is attached to a ring 10 conventionally comprising (FIG. 2) a generally polygonal annular rotor body 11 (known by the terminology polygonal ring), centered on the longitudinal axis A of the turbomachine and having a series of radial cylindrical housings 12, regularly distributed around the axis A, provide for receiving the propeller blades. Each housing 12 also receives a ring gear to which is attached the body of a plate designed to receive the root 14 of a blade P. This ring gear is mounted in rotation in the housing 12 that receives it, which makes it possible to adjust the angular orientation of the blade P.

To accomplish this, the inner surface of a housing 12 is machined and adjusted to constitute a hub which receives the ring gear and the bearing rings of different bearings interposed between the inner surface of said housing and said ring gear.

Documents FR 2 992 677, EP 2 586 701 and FR 2 953 487 describe examples of propeller rings comprising such cylindrical housings.

During operation, however, the outer rings of the bearings are severely loaded and wear rapidly. For example, the annular body 11 is subjected to very high tangential forces under the influence of centrifugal loads due in particular to its very large diameter (around 1600 mm) and, to a lesser extent, axial loads. The annular body 11 therefore has a tendency to elongate in the tangential direction. Now the bearing rings are generally sintered in zones subjected both to tangential deformations and to axial deformations. These deformations having different amplitudes, they induce ovalization of these bearing rings at the root 14 of the blades P, which is a source of friction and rapid wear for the rings.

Document GB 1 549 001 describes a propeller ring comprising a deformable bearing support designed to receive a bearing in a ring gear. To this end, the bearing support comprises a deformable seat surface in the ring gear having a spherical contour arranged to come into contact with the bearing when the ring gear is deformed. However, this deformation of the bearing support does not allow avoiding ovalization of the bearing rings at the root of the blades.

SUMMARY OF THE INVENTION

One aim of the invention is therefore to correct the problems encountered with propeller rings in the prior art, by proposing a propeller ring structure suitable for minimizing the deformations of bearing parts under the influence of centrifugal loads and thus to limit the wear of these parts and extend the lifetime of these bearing parts, which are difficult to reach after assembly.

For this purpose, the invention proposes a propeller ring of a turbomachine with variable-pitch blades, the propeller ring comprising a substantially coaxial annular body with a main axis and a plurality of radial housings uniformly distributed around the main axis, each radial housings being designed to receive a bearing for a root of a blade so as to allow the variable pitch of the blade. The radial housings also have, in a plane tangential to the annular body, a substantially ovoid cross-section, said substantially ovoid cross-section having a minor diameter and a major diameter whose dimensions are distinct.

Some preferred but non-limiting features of the propeller ring described above are the following:
- the section of the radial housings is elliptical,
- the major diameter is larger than the minor diameter, said major diameter extending substantially parallel to the main axis of the propeller ring,
- the major diameter is larger than the minor diameter, said minor diameter extending substantially parallel to the main axis of the propeller ring,
- the bearing comprises an outer bearing ring and a difference between the major diameter and the minor diameter of the substantially ovoid cross-section is comprised between 0.5 and 1% of a diameter of the outer bearing ring,
- the diameter of the outer bearing ring is on the order of 200 mm and the difference between the major diameter and the minor diameter is comprised between 1 mm and 2 mm,
- the bearing has, in the plane tangential to the propeller ring, a substantially circular cross-section, and
- the annular body has a polygonal shape.

The invention also proposes a propeller comprising a propeller ring as described above and blades placed in the housings of the propeller ring, as well as a turbomachine with variable pitch blades comprising such a propeller ring, the propeller preferably being unducted.

The propeller of the turbomachine can be unducted.

BRIEF DESCRIPTION OF THE DRAWINGS

Other features, aims and advantages of the present invention will appear more clearly upon reading the detailed description that follows, and with reference to the appended drawings given by way of non-limiting examples wherein.

DETAILED DESCRIPTION OF AN EMBODIMENT

A propeller ring 10 of a turbomachine 1 with variable pitch blades P according to the invention will now be described.

Figure 1:
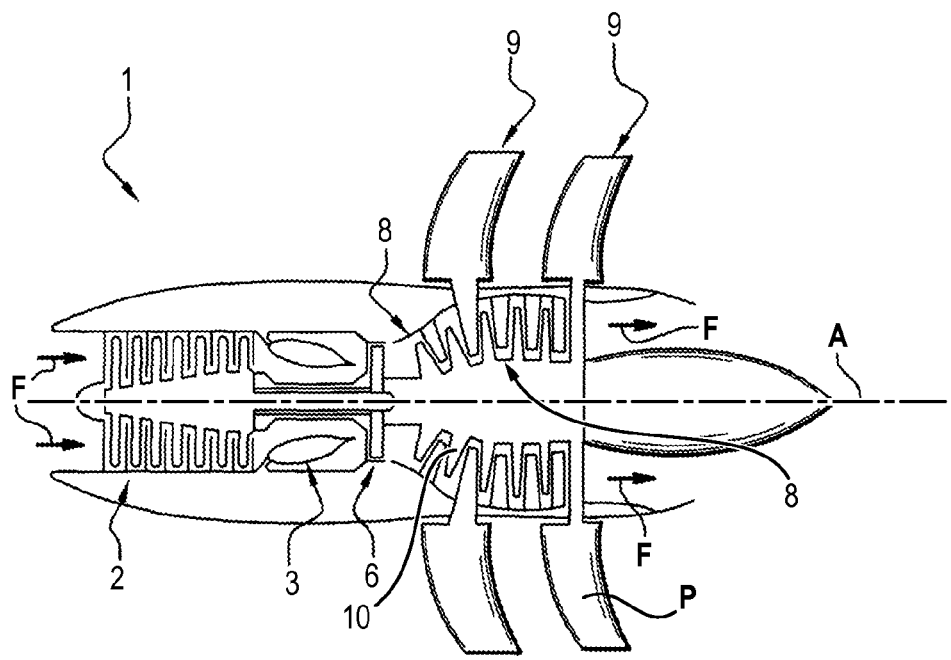
FIG. 1 is a schematic view of a turbomachine with unducted propellers.
Figure 2:
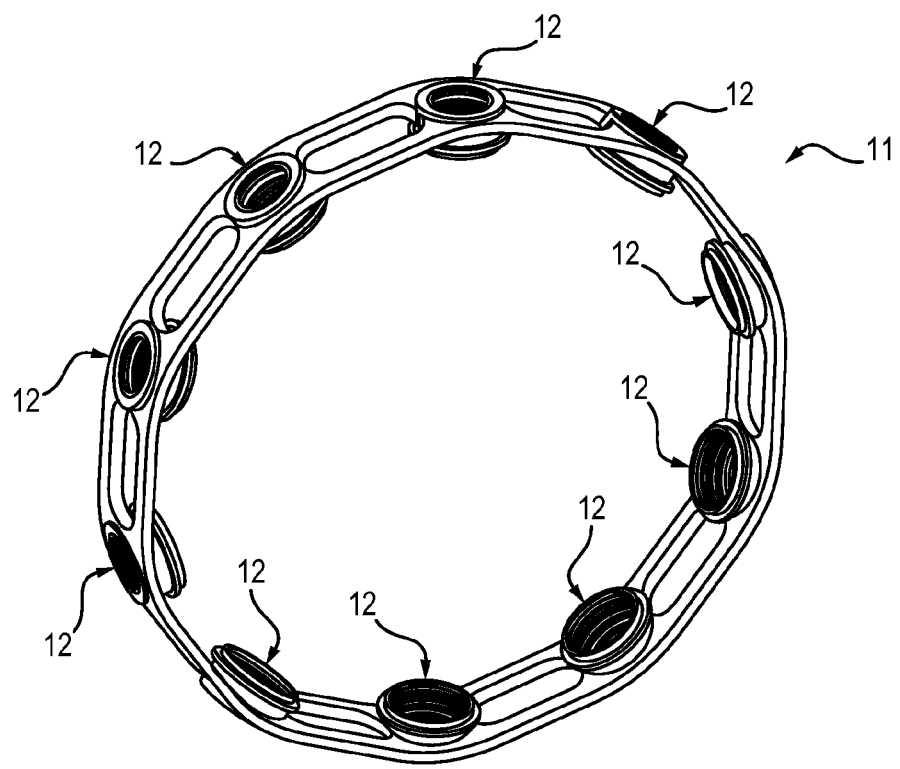
FIG. 2 illustrates schematically a polygonal propeller ring 10.
Figure 3:
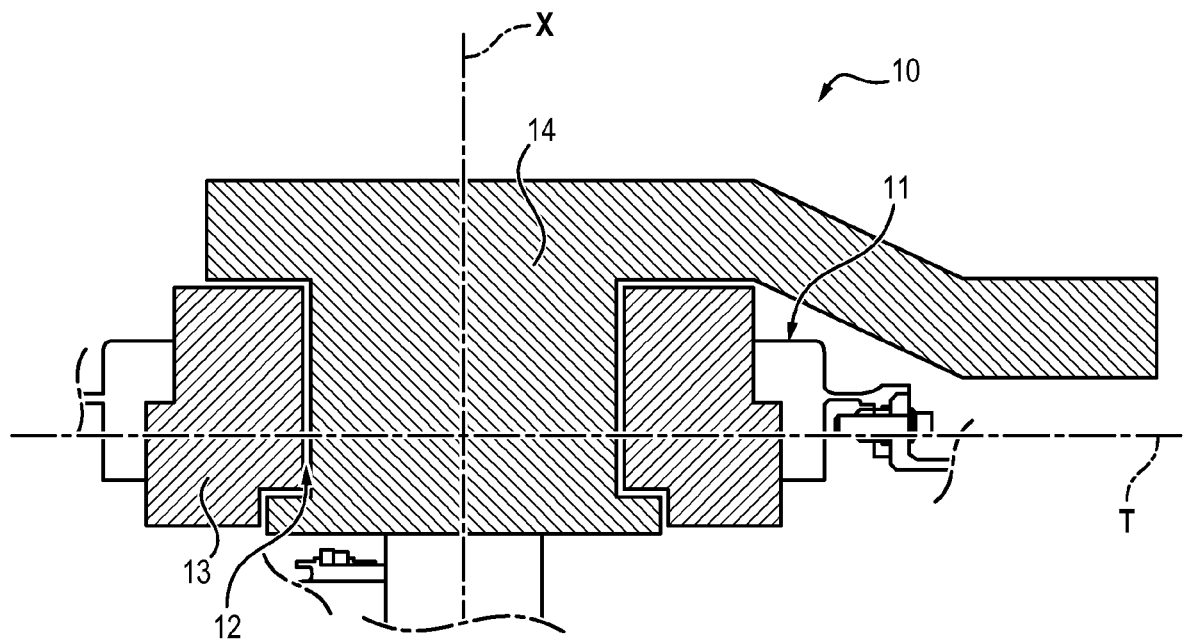
FIG. 3 shows, in a partial section view, a propeller module of a conventional open rotor (or unducted fan)

A propeller ring 10 according to the invention comprises, in a manner known in se and as previously described with reference to the appended FIGS. 1 to 3, an annular body 11 of the rotor, centered on the longitudinal axis A of the turbomachine 1 and having a series of radial housings 12 regularly distributed around the axis A. Each radial housing 12 is provided for receiving a bearing 13 of an associated blade P of the propeller 9, which makes it possible to adjust the angular orientation of the blade P.

To this end, each bearing 13 comprises in a manner known per se, ball bearings placed in an inner bearing ring and an outer bearing ring of circular shape.

Here, the annular body 11 of the rotor is of polygonal shape. This is not limiting, however, the annular body 11 being capable of having any suitable shape, a circular shape for example.

Figure 4:
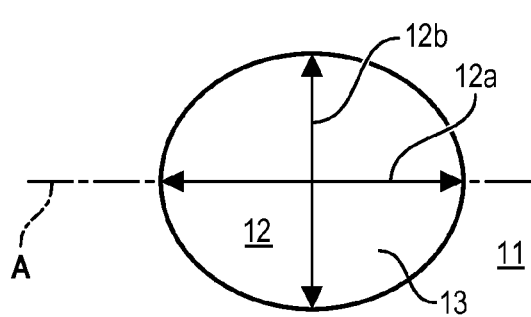
FIG. 4 is a top view of a first embodiment of a radial housing in a polygonal propeller ring 10.
Figure 5:
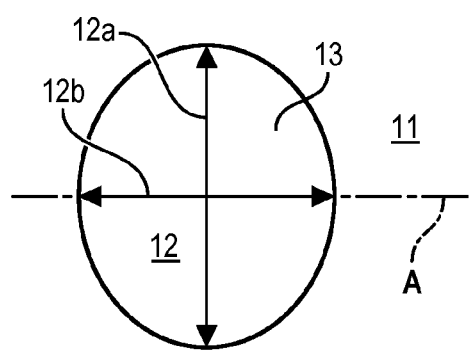
FIG. 5 is a top view of a second embodiment of a radial housing of a polygonal propeller ring 10.

As can be seen in FIGS. 4 and 5, the radial housings 12 have, in a plane T tangential to the annular body 11, a substantially ovoid cross-section.

What will be understood here by a plane T tangential to the annular body 11 is a plane substantially normal to a radial axis X of the propeller ring 10 (that is an axis perpendicular to the axis A of the propeller ring 10 and running through the axis A) and comprising the associated radial housing 12 and the bearing 13.

In one embodiment, the ovoid cross-section can for example be substantially elliptical.

The ovoid cross-section of each radial housing 12 comprises a minor diameter 12b and a major diameter 12a having a distinct dimension. Here, the minor diameter 12b is smaller than the major diameter 12a. For example, when the radial housing 12 is elliptical in shape, the minor diameter 12b corresponds to the shorter axis of the ellipse while the major diameter 12a corresponds to its long axis.

In a first embodiment illustrated in FIG. 4, the radial housings 12 have a substantially ovoid cross-section, the major diameter 12a (or long axis) whereof extends substantially parallel to the axis A of the propeller ring 10.

Such an embodiment makes it possible to correct deformations of the radial housings 12 due to very large tangential loads under the influence of centrifugal loads, which are greater than the axial forces to which the propeller ring 10 is subjected. This is the case in particular of the embodiment illustrated in FIG. 2, wherein the ring comprises inter-blade portions (that is arms connecting the radial housings 12) positioned on either side of the radial housings 12.

As a variant, in a second embodiment illustrated in FIG. 5, the radial housings 12 have a substantially ovoid cross-section, the minor diameter 12b whereof (or short axis A) extends substantially parallel to the axis A of the propeller ring 10.

Such an embodiment is advantageous when the propeller ring 10 is flexible and narrow. It is the case, for example, when the annular body 11 comprises inter-blade portions positioned at the center of the structure: such an annular body 11 is capable of having deformations of the radial housings in the axis parallel to the axis of revolution A of the ring. Implementation of radial housings 12 according to the second embodiment. It thus allows correction of the deformations of the radial housings 12 due to axial forces which are greater than the tangential forces to which the propeller ring 10 is subjected.

The ovoid shape of the cross-section of the radial housings 12 thus makes it possible to compensate the deformation of the radial housings 12 during operation of the turbomachine 1. In this manner, when the propeller ring 10 is under load (that is when the turbomachine 1 is in operation and the propeller ring 10 is subjected to considerable axial and/or centrifugal loads), the radial housings 12 deform until they attain a substantially circular cross-section allow good resistance of the parts of the bearing and optimal operation of the pitch of the blades P and an extension of the lifetime of the bearing parts. Typically, in the case of the radial housings 12 illustrated in FIG. 4 (ovoid axial cross-section), the centrifugal loads have a tendency to deform the radial housings 12 in the tangential direction, which tends to extend the minor diameter 12b of the ovoid cross-section and to reduce its major diameter 12a.

The minor diameter 12b and the major diameter 12a of the ovoid cross-section of the radial housings 12 are therefore selected so that, under load, the second of the radial housings 12 takes on a circular geometry.

The difference between the major diameter 12a and the minor diameter 12b of the substantially ovoid cross-section of the radial housings 12 can for example be comprised between 0.5 and 1% of the diameter of the radial housing 12 under load. The diameter of the radial housing 12 under load corresponds substantially to the diameter of the outer bearing ring, the difference between the major diameter 12a and the minor diameter 12b of the substantially ovoid cross-section of the radial housings 12 can therefore be comprised between 0.5 and 1% of the associated bearing 13.

Typically, for a radial housing 12, the diameter whereof under load must be on the order of 200 mm, the difference between the major diameter 12a and the minor diameter 12b is comprised between 1 mm and 2 mm.

In order to create radial housings 12 with a substantially ovoid cross-section while still retaining the cylinder-of-revolution shape of the bearing rings, it is for example possible to sinter the bearing rings by heating the ring then to deform the minor diameter 12b of the radial housings 12 until reaching a slightly greater diameter than that of the bearing rings (typically a few tenths of millimeters) to allow assembly.

The invention thus proposes to correct the deformation of the radial housings 12, rather than attempting to prevent or limit this deformation by directly modifying the structure of the propeller ring 10, which negatively impacts the mass, as is generally proposed in conventional propeller rings 9. The proposed solution is therefore simple to implement and does not impact the size or the overall weight of the propeller ring 10.

The invention claimed is:

1. Propeller ring of a turbomachine with variable pitch blades, the propeller ring comprising an annular body substantially coaxial with a main axis and a plurality of radial housings uniformly distributed around the main axis, each radial housing being designed to receive a bearing for a root of a blade so as to allow variable pitch of the blade, the propeller ring wherein the radial housings have, in a plane tangential to the annular body, a substantially ovoid cross-section, said substantially ovoid cross-section having a minor diameter and a major diameter with distinct dimensions, wherein the bearing has, in the plane tangential to the propeller ring a substantially circular cross-section.

2. The propeller ring according to claim 1, wherein the section of the radial housings is elliptical.

3. The propeller ring according to claim 1, wherein the major diameter is greater than the minor diameter, said major diameter extending substantially parallel to the main axis of the propeller ring.

4. The propeller ring according to claim 3, wherein the bearing comprises an outer bearing ring and a difference between the major diameter and the minor diameter of the substantially ovoid cross-section is between 0.5 and 1% of a diameter of the outer bearing ring.

5. The propeller ring according to claim 4, wherein the diameter of the outer bearing ring is on the order of 200 mm and the difference between the major diameter and the minor diameter is between 1 mm and 2 mm.

6. The propeller ring according to claim 1, wherein the major diameter is greater than the minor diameter, said minor diameter extending substantially parallel to the main axis of the propeller ring.

7. The propeller ring according to claim 1, wherein the annular body has a polygonal shape.

8. A turbomachine with variable pitch blades, comprising a propeller ring according to claim 1.

9. The turbomachine according to claim 8, wherein the propeller is unducted.

10. Propeller ring of a turbomachine with variable pitch blades, the propeller ring comprising an annular body substantially coaxial with a main axis and a plurality of radial housings uniformly distributed around the main axis, each radial housing being designed to receive a bearing for a root of a blade so as to allow variable pitch of the blade, the propeller ring wherein the radial housings have, in a plane tangential to the annular body, a substantially ovoid cross-section, said substantially ovoid cross-section having a minor diameter and a major diameter with distinct dimensions, wherein the major diameter is greater than the minor diameter and wherein one of the major diameter and the minor diameter extends substantially parallel to the main axis of the propeller ring.

11. The propeller ring according to claim 10, wherein the section of the radial housings is elliptical.

12. The propeller ring according to claim 10, wherein the major diameter extends substantially parallel to the main axis of the propeller ring, the bearing comprising an outer bearing ring and a difference between the major diameter and the minor diameter of the substantially ovoid cross-section is between 0.5 and 1% of a diameter of the outer bearing ring.

13. The propeller ring according to claim 12, wherein the diameter of the outer bearing ring is on the order of 200 mm and the difference between the major diameter and the minor diameter is between 1 mm and 2 mm.

14. The propeller ring according to claim 10, wherein the bearing has, in the plane tangential to the propeller ring a substantially circular cross-section.

15. The propeller ring according to claim 10, wherein the annular body has a polygonal shape.

16. A turbomachine with variable pitch blades, comprising a propeller ring according to claim 10.

17. The turbomachine according to claim 16, wherein the propeller is unducted.

18. Propeller ring of a turbomachine with variable pitch blades, the propeller ring comprising an annular body substantially coaxial with a main axis and a plurality of radial housings uniformly distributed around the main axis, each radial housing being designed to receive a bearing for a root of a blade so as to allow variable pitch of the blade, the propeller ring wherein the radial housings have, in a plane tangential to the annular body, a substantially ovoid cross-section, said substantially ovoid cross-section having a minor diameter and a major diameter with distinct dimensions, wherein the section of the radial housings is elliptical.

19. The propeller ring of claim 18, wherein the major diameter is greater than the minor diameter and wherein one of the major diameter and the minor diameter extends substantially parallel to the main axis of the propeller ring.

20. The propeller ring according to claim 19, wherein the major diameter extends substantially parallel to the main axis of the propeller ring, the bearing comprising an outer bearing ring and a difference between the major diameter and the minor diameter of the substantially ovoid cross-section is comprises between 0.5 and 1% of a diameter of the outer bearing ring.

21. A turbomachine with variable pitch blades, comprising a propeller ring according to claim 18.

* * * * *